UNITED STATES PATENT OFFICE.

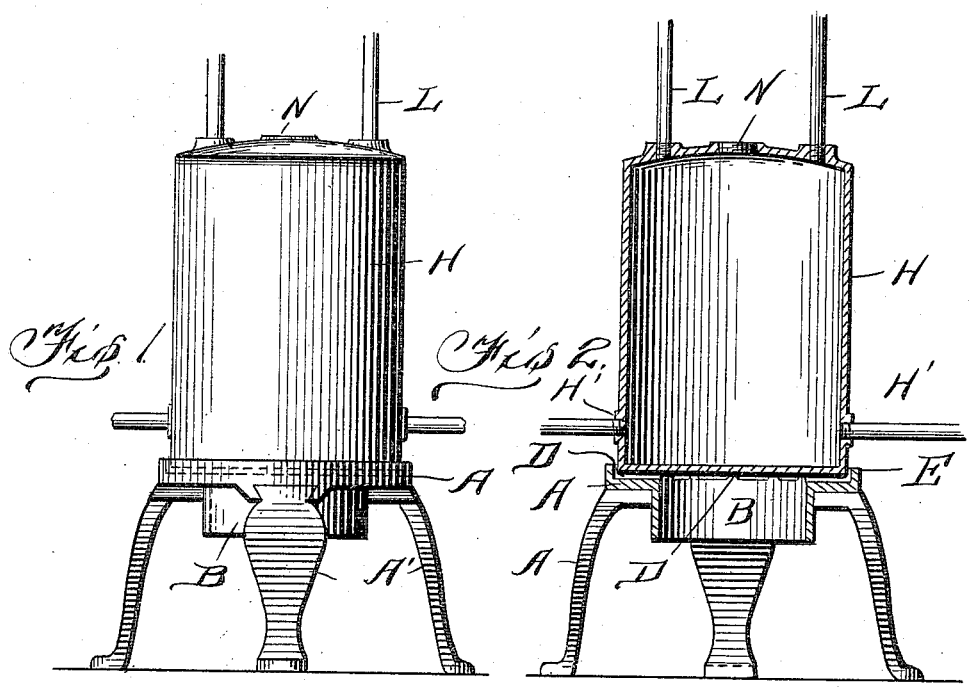
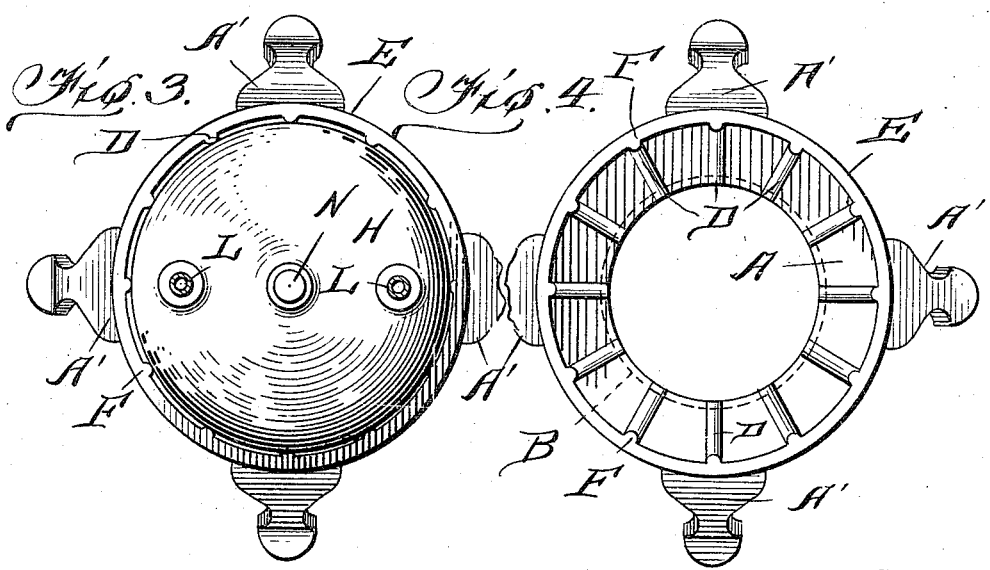

AUGUST ROBERT LUNDIN, OF SALT LAKE CITY, UTAH.

HEATER.

985,610.  Specification of Letters Patent.  Patented Feb. 28, 1911.

Application filed April 29, 1910.  Serial No. 558,473.

*To all whom it may concern:*

Be it known that I, AUGUST ROBERT LUNDIN, a citizen of the United States, residing at Salt Lake City, in the county of Salt Lake and State of Utah, have invented certain new and useful Improvements in Heaters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in heaters for various purposes and comprises a simple and efficient device of this nature adapted to heat water which is supplied by pipes, the device being so arranged that the heater may be used independent of the water-containing receptacle.

The invention comprises various details of construction and combinations and arrangements of parts which will be hereinafter fully described and then specifically defined in the appended claim.

I illustrate my invention in the accompanying drawings, in which:—

Figure 1 is a side elevation of the heater. Fig. 2 is a sectional view vertically and centrally through the same. Fig. 3 is a top plan view, and Fig. 4 is a top plan view of the base with the water-containing receptacle removed.

Reference now being had to the details of the drawings by letter, A designates the base of the device having legs A' and a central opening B underneath which a burner of any description may be positioned. The top of said base is provided with a series of radial ribs D and a circumferential flange E, said ribs extending up the inner marginal edges of said flange as at F.

H designates the receptacle adapted to contain the liquid to be heated and is provided with openings H' near the bottom at any suitable locations and which may be utilized for draining the receptacle, and pipes L lead through openings in the top and through which water may enter and pass from the receptacle. A central opening N in the top is provided whereby water may be placed within the receptacle. Said receptacle H is of such a size as will rest upon the ribs D and be surrounded at its lower end by the flange E, while the upwardly turned rib portions F on the inner marginal edge of the flange serve as means for spacing the circumference of the receptacle H from said standard and the ribs D hold the bottom of the receptacle above the top, the space between the bottom of the receptacle and the top of the base and between the receptacle and the flange being sufficient to allow the heat to readily pass against the bottom of the receptacle and up the sides, thus evenly distributing the heat about the receptacle in which the water or other liquid to be heated is adapted to circulate.

It will be understood that my heater may be made of any suitable material, such as cast iron, and preferably in one piece and so constructed that it will stand heavy pressure and so arranged that it may be conveniently and readily cleaned by forcing water through the pipes communicating with the receptacle.

What I claim to be new is:—

A heater comprising a base the upper surface of which is provided with a series of radial ribs and having a circular opening with downwardly extending flange at the marginal edge thereof, the under side of said base having dove-tail recesses, the inner walls of which are formed by said flange, legs engaging said dove-tail recesses and in contact with the flange at their inner ends, the circumference of the top of the base having an annular flange, radially disposed vertical ribs upon the inner face of the latter and continuous with said radial ribs, and a heater resting upon said radial ribs and spaced apart from the flange and top of the base by said ribs.

In testimony whereof I hereunto affix my signature in the presence of two witnesses.

AUGUST ROBERT LUNDIN.

Witnesses:
G. H. BACKMAN,
S. A. BACKMAN.

---

Copies of this patent may be obtained for five cents each, by addressing the "Commissioner of Patents, Washington, D. C."